US006965823B2

(12) United States Patent
Wichner

(10) Patent No.: US 6,965,823 B2
(45) Date of Patent: Nov. 15, 2005

(54) OPERATING METHOD AND DEVICE FOR OPERATING AUTOMATED CONTAINER QUAY CRANES

(75) Inventor: Wolfgang Wichner, Wendelstein (DE)

(73) Assignee: Siemens Aktiengesellschaft, München (DE)

( * ) Notice: Subject to any disclaimer, the term of this patent is extended or adjusted under 35 U.S.C. 154(b) by 49 days.

(21) Appl. No.: 10/467,977

(22) PCT Filed: Feb. 7, 2002

(86) PCT No.: PCT/DE02/00454

§ 371 (c)(1),
(2), (4) Date: Nov. 25, 2003

(87) PCT Pub. No.: WO02/064486

PCT Pub. Date: Aug. 22, 2002

(65) Prior Publication Data

US 2004/0073358 A1 Apr. 15, 2004

(30) Foreign Application Priority Data

Feb. 13, 2001 (DE) ........................................ 101 07 048

(51) Int. Cl.[7] ........................ G06F 17/00; G06F 19/00; G06F 7/00

(52) U.S. Cl. ............................ 701/59; 701/36; 701/50; 701/58; 701/1; 700/47; 700/17; 700/83; 700/214; 212/219; 212/276; 340/685; 414/139.6; 414/140.3

(58) Field of Search .................... 700/43, 83, 213–214, 700/217, 219; 340/685, 686.1, 679, 680, 686; 701/1, 35, 36, 55, 58–59; 414/140.3, 141.3, 141.4, 139.6; 212/316–317, 318, 276, 290

(56) References Cited

U.S. PATENT DOCUMENTS

| | | | | |
|---|---|---|---|---|
| 3,952,891 A | * | 4/1976 | Terayama et al. ........... | 414/809 |
| 4,916,628 A | * | 4/1990 | Kugler ....................... | 700/286 |

(Continued)

FOREIGN PATENT DOCUMENTS

| | | |
|---|---|---|
| DE | 42 31 766 A1 | 3/1994 |
| DE | 44 23 797 A1 | 1/1996 |
| DE | 195 02 421 C2 | 8/1996 |
| DE | 100 01 023 A | 7/2001 |
| EP | 0 961 199 A | 12/1999 |
| EP | 1 116 684 A | 7/2001 |
| JP | 05 085697 A | 4/1993 |
| JP | 06 124105 A | 5/1994 |
| JP | 06 293495 A | 10/1994 |

OTHER PUBLICATIONS

Geither K et al.: "Automation of Dockside Container Cranes Employing Process Computers" Siemens Power Engineering, Siemens AG. Berlin, DE, vol. 2, No. 1, 1980, pp. 17–21, XP000718326.

Wichner W: "An easier Life for Crane–Drivers" Engineering and Automation, Siemens Aktiengesellschaft, Berlin, DE, vol. 19, No. 5, 1997, pp. 20–22, XP000734937 ISSN: 0939–2068.

*Primary Examiner*—Ramesh Patel
(74) *Attorney, Agent, or Firm*—Henry M. Feiereisen

(57) ABSTRACT

An operating method for container quay cranes used to load and unload container ships aided by a PC with a monitor in a crane driver's cabin.

The crane driver operates a touchscreen on the monitor, thereby enabling the crane to reach its specified target in a fully or partially automatic manner.

Several operating modes, including a training mode, are provided.

7 Claims, 6 Drawing Sheets

U.S. PATENT DOCUMENTS 5,731,974 A 3/1998 Pietzsch et al.
5,775,866 A * 7/1998 Tax et al. ................ 414/140.3
6,140,930 A * 10/2000 Shaw ......................... 340/685
6,356,802 B1 * 3/2002 Takehara et al. ............ 700/215
6,470,240 B1 * 10/2002 Haynes et al. ................. 701/1
6,717,376 B2 * 4/2004 Lys et al. ................... 315/292
6,744,372 B1 * 6/2004 Shaw et al. ................. 340/685
6,768,931 B2 * 7/2004 Takehara et al. ............ 700/225
2002/0092820 A1 * 7/2002 Chattey ...................... 212/325
2004/0059321 A1 * 3/2004 Knopp et al. ................. 606/10

* cited by examiner

OPERATING METHOD AND DEVICE FOR OPERATING AUTOMATED CONTAINER QUAY CRANES

BACKGROUND OF THE INVENTION

It appears to be impossible for the foreseeable future to replace a crane operator of container quay cranes with an automatic control. Today's container quay cranes are therefore operated in a semi-automatic fashion. Such semi-automatic operation has been successfully implemented.

However, the loading/unloading capability of these cranes lags behind expectations. The reason for this is that the majority of the crane operators have difficulties operating the automatic functions. What is lacking so far is a suitable man-machine interface which optimizes the interaction between the crane operator and the automatic control, as well as a corresponding operating method.

Thus far, various switches, pushbuttons and indicator lamps have been provided in the consoles of the crane operator's seat for operating the automatic control. However, these simple means give the crane operator insufficient information about the operating state of the automatic control, about the targets to be reached next by the automatic control, about error or warning messages, and/or about other operating states of the automatic control. In addition, these simple means limit a possible intervention in the automatic control.

SUMMARY OF THE INVENTION

The invention solves the aforedescribed technical problem in the following manner:

a) All operating and display elements are effectively combined on a touch screen. The touch screen is located on the right side next to and within reach of the crane operator's seat. This eliminates the operating knobs, pushbuttons and indicator lamps which were hitherto distributed in an often confusing and non-standard manner across the console of the crane operator's seat.

b) All essential control commands transmitted to the automatic control are entered on the touch screen by touching touch sensors.

c) All important information received from the automatic control are displayed on the touch screen.

d) A computer is associated with the touch screen. The computer processes the signals for display to the crane operator in ergonomic form.

e) The same computer also computes the target parameters for the automatic travel. Conventional solutions have so far left this task to the crane control, which resulted in many different non-standard solutions beset with errors.

The ergonomically constructed touch screen operator interface allows the crane operator, on one hand, to optimally observe the actions of the automatic control and, if necessary, to easily and safely intervene. On the other hand, the MMI touch screen can also provide the crane operator with instructions in the form of visual and optionally acoustic messages. This optimizes the exchange between automatic and manual operation.

According to the invention, crane operators which are frequently assigned to the different cranes with a different automation system, need no longer review an operating manual for the automatic operation before operating an automatic crane. Crane operators do not like and therefore frequently avoid reviewing operating instructions, relying on their memory instead. This can lead to mistakes.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
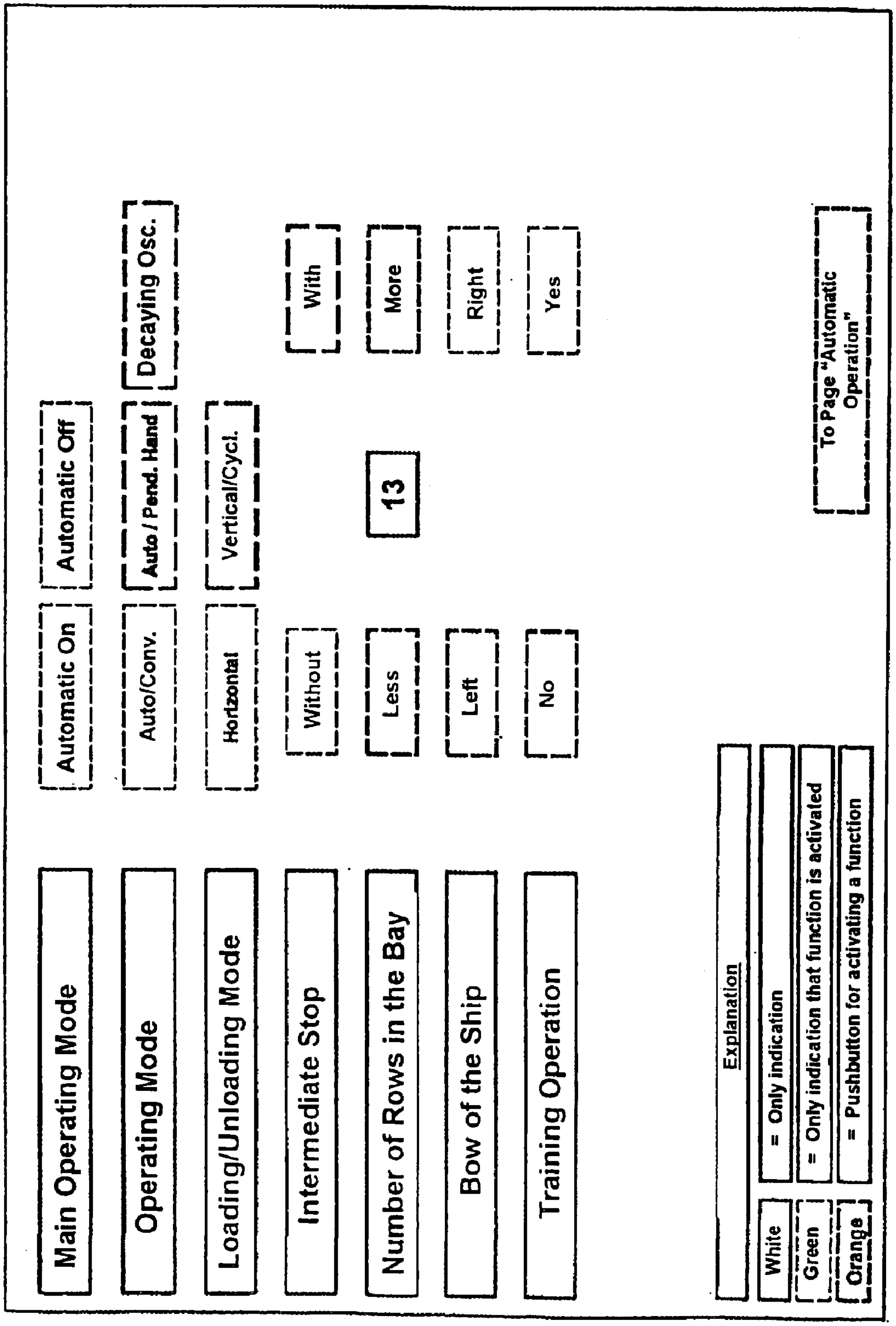
FIG. 1 shows a touch screen display for setting a main operating mode.

Throughout all the Figures, same or corresponding elements are generally indicated by same reference numerals. These depicted embodiments are to be understood as illustrative of the invention and not as limiting in any way.

When starting work on the crane, the crane operator turns on the touch screen. He then sees on the touch screen the image according to FIG. 1.

Color Selection

| | |
|---|---|
| White background | Messages (text, numbers) |
| Orange background | Touch field, function not activated |
| Green background | Touch field, function activated |
| Light blue | Target indication |
| Gray | Crane outline |
| Red | End positions |
| Purple | Ship outline |
| Yellow | Message bar |

Advantageously, a dark blue background is selected to enhance visibility. Visualization by selecting suitable colors is important since the high workload can cause a significant decrease in the mental concentration of the crane operator during a shift. A blue background color is particularly advantageous for the following reasons:

- it prevents glare from the touch screen to the crane operator at night
- it highlights the display fields and the operating button

OPERATING MODE

1. The Crane Operator Starts Work with the Help of a Basic Setup Page.

Initially, the crane operator has to enter the basic settings for the automatic operation with the following operating steps:

1.1 Setting the Main Operating Mode

The crane operator can switch the automatic operation on and off by using a switch which for safety reasons is the only operating component that is not located on the touch screen. The selection by the external switch is indicated on the touch screen in the uppermost row of FIG. 1 by a color change of the corresponding display field to green.

1.2 Selecting the Operating Mode

The crane operator has hereby 3 possibilities:

Switching between fully automatic travel (in particular for bridging the large distance between land side and water side without introducing oscillations) and conventional operation (typically for fine-positioning of the load above the target, in particular on the ship).

Switching between automatic operation (again for overcoming the large distance) and manual operation with, i.e. for controlling the speed of the load (also for fine positioning of the load).

Function "Calming Oscillations" (arresting and positioning the load on the target after previous operation without oscillation control)

1.3 Loading/Unloading Mode

Vertically/cyclically Unloading or loading the container always in the same row on the ship Horizontally Removing or stacking the containers layer-by-layer 1.4 Intermediate Stop When selecting the function Intermediate Stop, the containers are not directly transported to the corresponding target by the automatic control, but are first brought to rest at an intermediate stop position. This intermediate stop position is located on the land side below the crane. There, either the custom seal of the container is checked and/or the automatic twist locks are inserted in or removed from the bottom of the containers. After these task have been completed, the automatic control directs the container to the actual target.

1.5 Number of Rows in the Bay

Here, the crane operator informs the automatic control of the number of rows of containers that are located in the ship's bay to be processed. The crane operator can increase or decrease the number of rows by using pushbuttons labeled "More" or "Less". The display field located between the two pushbuttons indicates the number of rows previously set by the crane operator.

1.6 Ship's Bow

The crane operator can indicate to the automatic control if the bow of the ship in front of him is located to the left or to the right of his position. The automatic control can use this information together with the information about the number of rows in the bay to insert the correct numbering of the container positions on the ship into the image depicted in FIG. 2. Further details can be found in the description of FIG. 2.

1.7 Training Operation

When selecting the mode Training Operation, the crane operator can simulate to the automatic control by using a suitable pushbutton that a container was unloaded or received on the ship or the land side. It is the goal to allow switching of the target between ship side and land side even if no ship, on which container can be loaded or unloaded, is currently present. This functionality is necessary, since crane operators have to first train without a ship before beginning with the loading/unloading operation.

Figure 2:
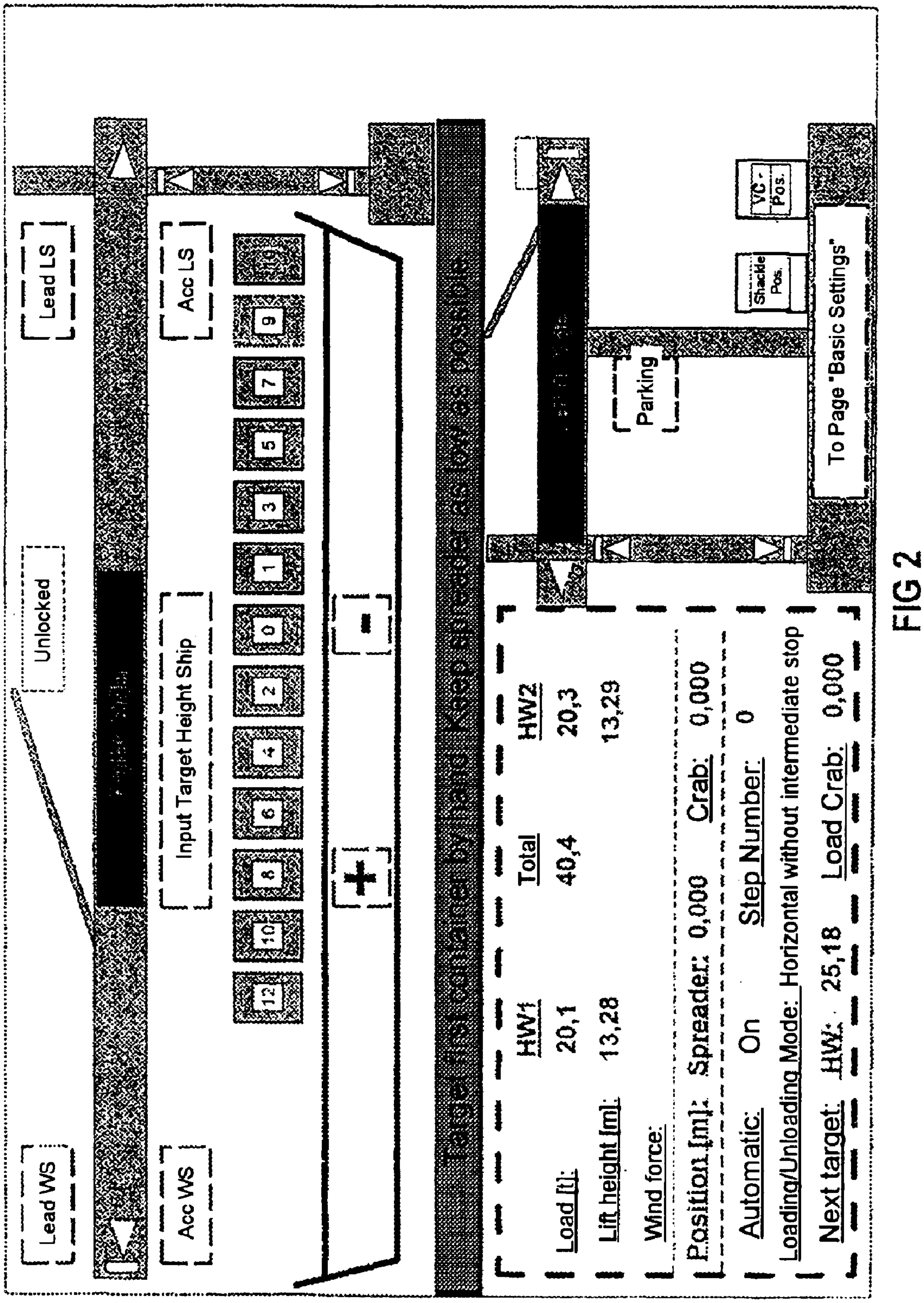
FIG. 2 shows a touch screen display for labeling container positions on a ship.

After completing the basic settings, the crane operator touches the button "To Page Automatic Operation" in the lower right part of FIG. 1, thereby arriving at the actual operating page depicted in FIG. 2.

2. Page "Automatic Operation"

The crane operator keeps the page "Automatic Operation" permanently switched on when working on the ship. Changing to another page may distract the crane operator from his task, potentially leading to dangerous situations. For this reason, all relevant information and operating elements are included on the page "Automatic Operation" in ergonomic form.

The displayed image is essentially divided into three parts.

The water side (ship side) of the crane is located in the upper half of the image (above the yellow message bar).

The land side of the crane is depicted in the lower right half of the image.

Those operating data, which the crane operator has to monitor continuously, are depicted in the lower left section of the displayed image.

2.1 The Water Side 2.1.1 Crane Frame

The crane frame and—in the lower right corner—the quay edge are depicted in a gray color.

2.1.2 Travel Direction of the Crab and Lifting Assembly

The white triangles in the crane frame represent arrow heads, which change to a green color in the direction in which the crane crab moves. The same applies to the arrow heads in the vertical crane leg when the load moves in the direction Raising or Lowering.

2.1.3 Limit Switch

The color of the small white rectangles in front of the arrow heads changes to red when the crab and/or the lifting gear reaches the corresponding limit switch.

2.1.4 Container Positions and Target Settings

The cross section of the ship is schematically indicated below the water-side crane jib. The container positions on or in the ship are depicted by numbered rectangular fields which represent the container receiving shafts below deck or the uppermost row of the containers loaded on deck.

The containers located below have been deliberately omitted, since they are irrelevant for the crane operator's operations. Displaying redundant information would distract the crane operator and hence impede the safety of the operation.

The number of rectangles corresponds to the number of rows in the bay entered by the crane operator under "Number of Rows in the Bay" when entering the basic settings.

A display field with a white background is located in the center of the rectangles and shows the number of the row according to an international standard. Rows on the starboard side of the ship are indicated with odd numbers in ascending order from the center of the ship to the outside. Rows on the port side of the ship are indicated with even numbers in ascending order from the center of the ship to the outside. If the ship has an odd number of rows, then the center rows has the number 0. Conversely, if the ship has an even number of rows, then the row 0 is omitted. The computer associated with the touch screen enters the numbers in the display fields of the rectangles depending on the number of rows in the bay and the particular situation, i.e., if the bow of the ship is positioned to the right, i.e. the starboard side is near the quay edge, and vice versa. This provides the crane operator with a direct correlation between the load manifest and the visualization on the touch screen.

TARGET DEFINITION

The container rectangles also indicate to the crane operator the target that the automatic control is traveling to next. The border around the number field inside the rectangles then changes its color from gray to light blue, if the automatic control has determined that this row is to be the target for the automatic travel towards the ship side. The interior of the indicator field of the row number can also be colored light blue. This change in color indicates the last target to which the automatic control has traveled. This provides the crane operator with a point of reference between the previous target and the next target during automatic travel.

CHANGE OF TARGETS

The computer associated with the touch screen computes the next target depending if horizontal or vertical loading/unloading has been selected or if the ship is unloaded or loaded. In vertical operation, the target will be identical to the target in the last operation. In horizontal operation, one moves by one row farther towards the land side than in the previous operation. In horizontal loading, the next target is one row farther towards the water side than in the previous operation.

Figure 3:
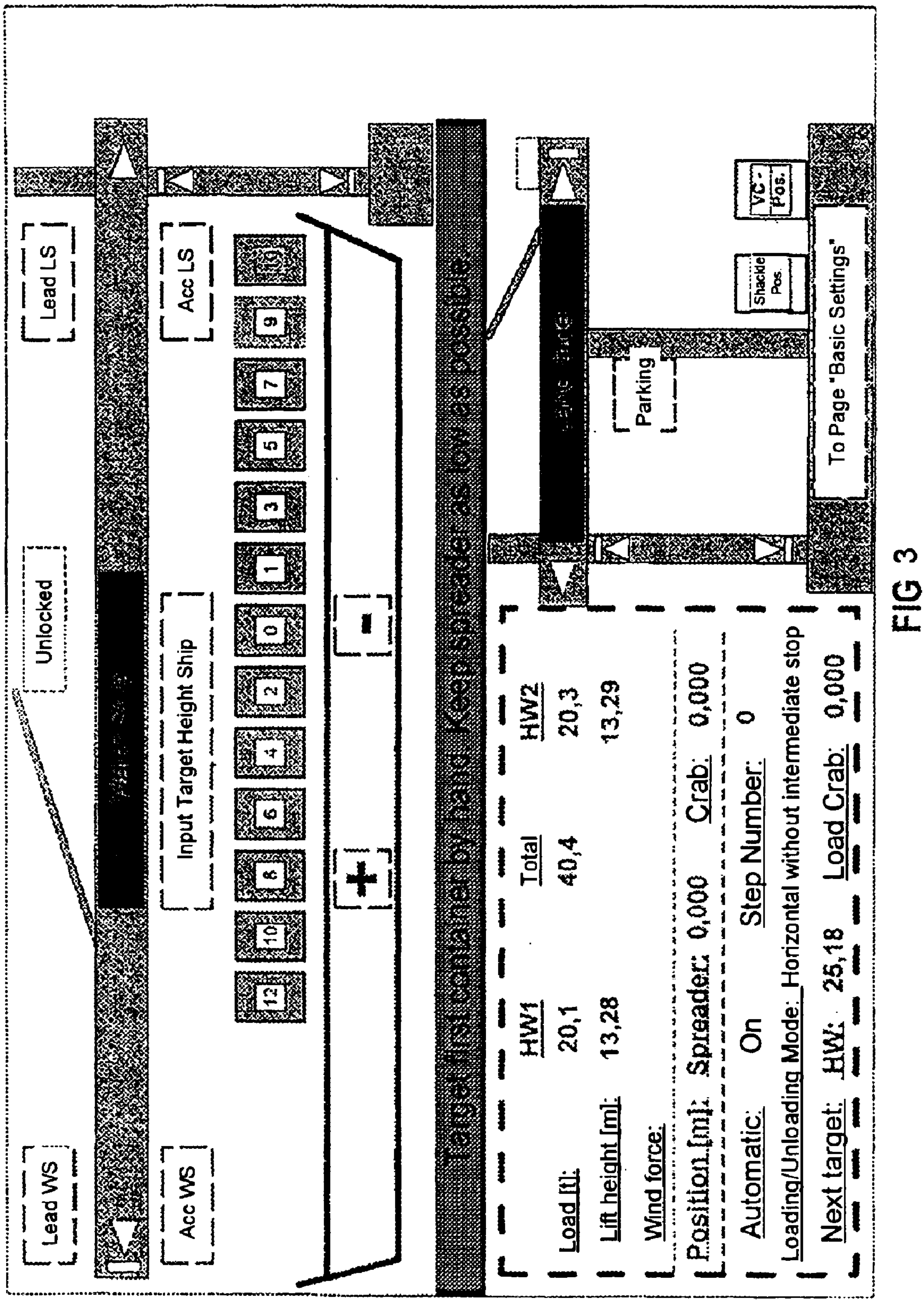
FIG. 3 shows a touch screen display for defining a container target position.

If the crane operator wants to change the target, he can use the touch button labeled "+" or "−". When activating the "+" button, the target jumps by one row farther towards the water side. When the "−" button is activated, the target jumps by one row farther towards the land side. The target can be shifted by several rows by pressing the button several times. The light blue border around the number field then jumps to the newly defined field. This gives the crane operator full control of the set target (see FIG. 3).

2.1.5 Target Position Lead

In the upper right corner, the touch button "Lead LS" (Lead Land Side) is located.

Figure 4:
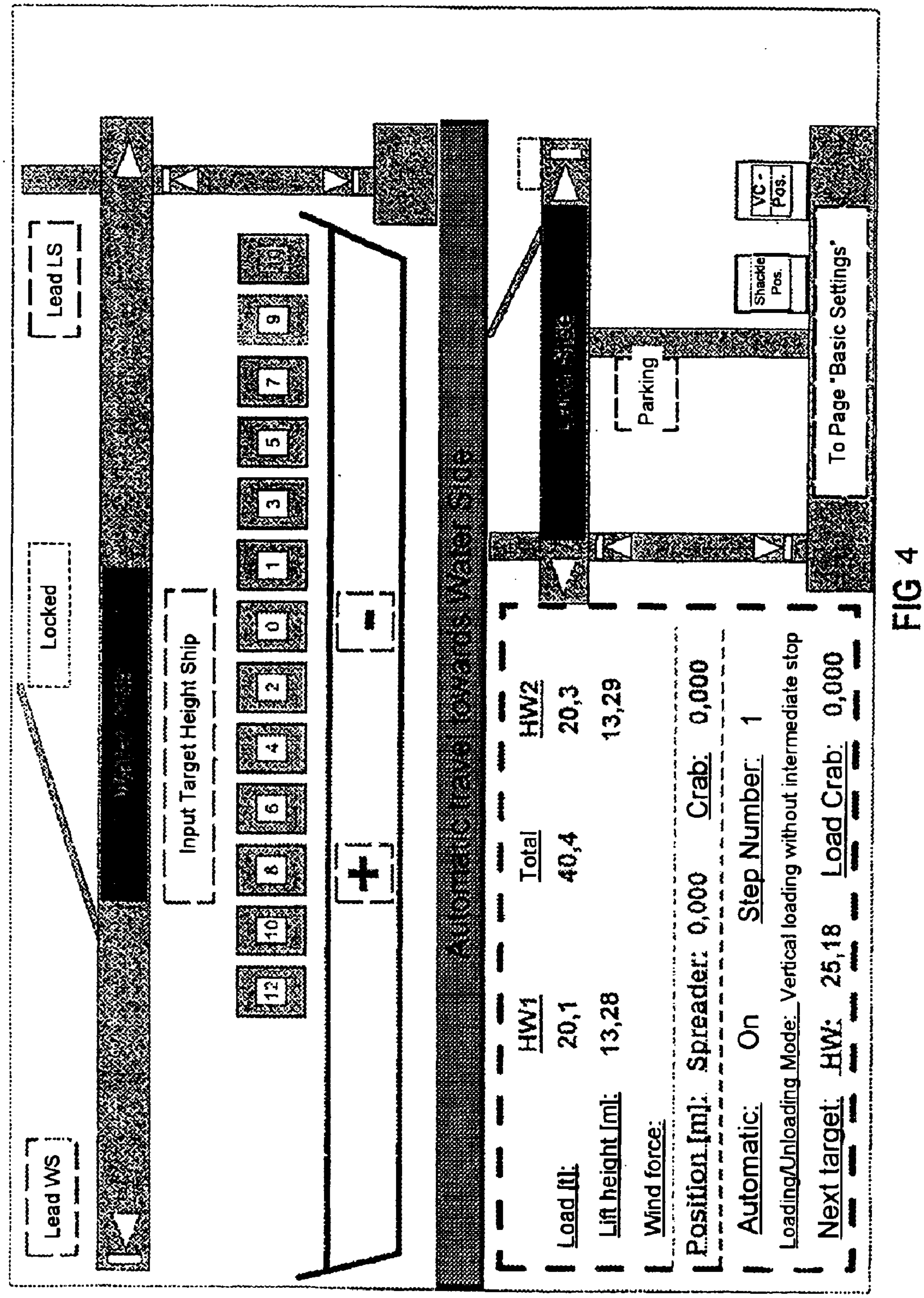
FIG. 4 shows a touch screen display for defining a container lead.

In a horizontal loading/unloading operation, the crane operator frequently does not want the automatic control to not move the load directly to the target position located exactly above the intended container row, but wants the load to come to rest approximately half a meter closer to the land side (coming to rest is intended to indicate being suspended above the target, without swaying or oscillating). This enables the crane operator to conveniently lean the load softly against the adjacent container—this time in manual operation. If the automatic control were to move the load directly above the target, then the crane operator would have to first manually move the load a small distance towards the land side, then lower the load, and then again manually lean the load against the adjacent container towards the water side. This is necessary because the load typically performs a more or less severe skew oscillation (rotation oscillation about the vertical axis), so that there is a danger that, when the load is lowered, one corner bumps against the neighboring container. (Activation of the function see FIG. 4)

Conversely, a touch button "Lead WS" (Lead Water Side) is provided in the upper left region of the image when the containers are intended to lean against the neighboring container from the water side.

2.1.6 Target Jumps to the Water Side or Land Side End of the Ship

During horizontal loading and unloading operation, it occurs regularly that the loading and/or unloading operation on the land side or water side edge of the ship should be continued. For this reason, two additional touch buttons "Towards LS" (towards the land side) and "Towards WS" (towards the water side) are displayed for the basic settings according to FIG. 1 on the image shown in FIG. 2 when selecting the horizontal loading/unloading operation. The crane operator can then initiate a target jump to either the container row closest to the land side or to the container row located farthest to the water side.

2.1.7 Teach Function

A large touch button "input target height ship" which has two Teach functions is located in the center of the container rectangles.

2.1.7.1 Input Target Height Ship

At the beginning of the operation, the crane operator moves the load above the ship to the desired height and pushes the above-referenced touch button. This height is then assumed to be the target height for the subsequent automatic travel. The height can be reset for all additional travel by again pushing this button.

2.1.7.2 Input Container Row

Figure 5:
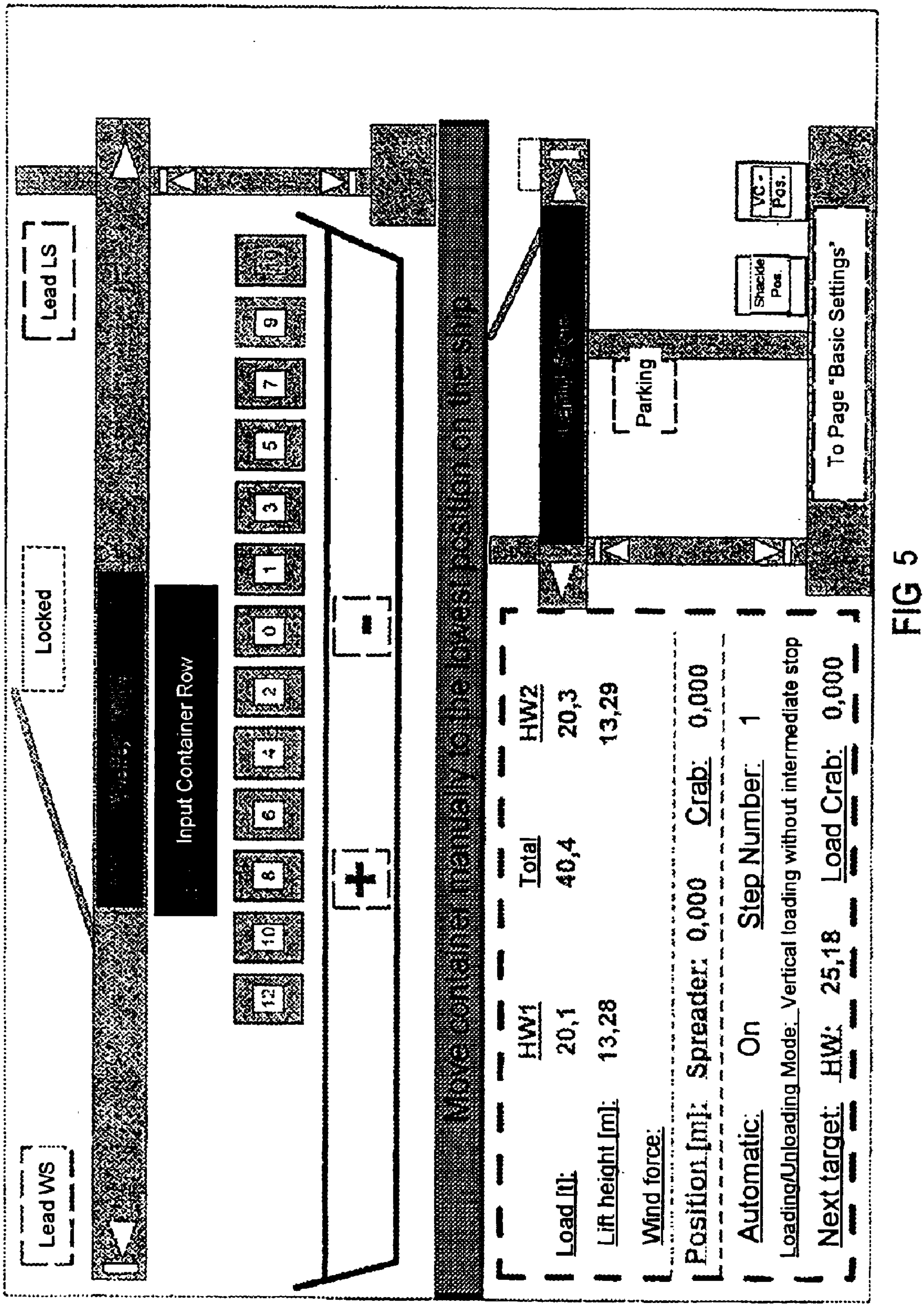
FIG. 5 shows a touch screen display for positioning a container on a ship.

After inputting the target height, the text on the touch button changes to "Input Actual Container Row." This operation occurs only during the first travel to the ship. The automatic control computes the most likely row based on the actual geometric data which corresponds to the actual position and indicates the result by changing the color of the corresponding rectangles to yellow. However, if the automatic has miscalculated this first indicated row, then the crane operator can correct this by pushing the button "+" or "−" and confirm the result by pressing the touch button (see FIG. 5). For all subsequent travel, the touch button displays again the text "Input Target Height Ship." It this way, the crane operator can correct the target height above the ship for each travel, if desired.

2.1.8 Simulation and Display "Unlocked-Locked"

Figure 6:
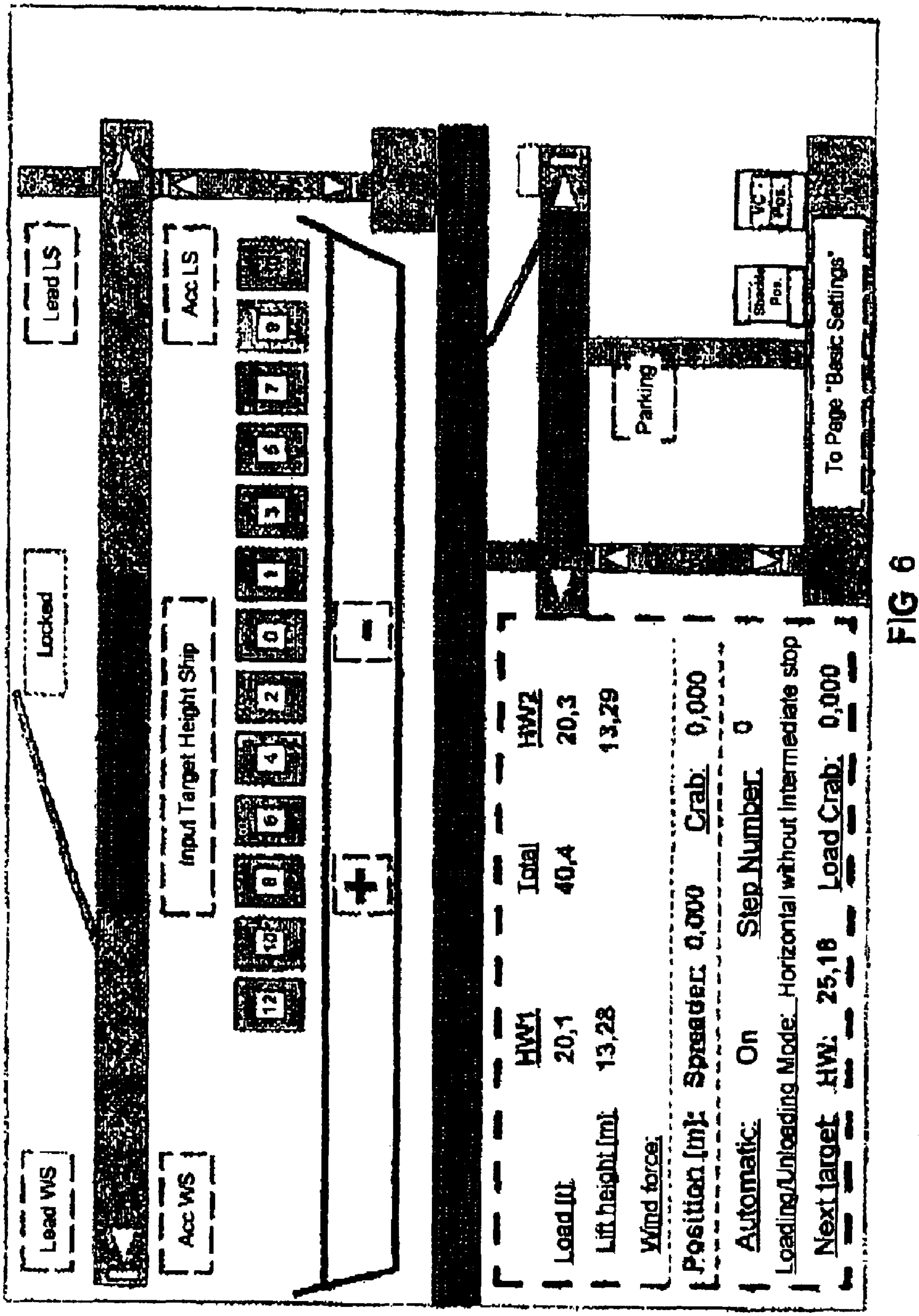
FIG. 6 shows a touch screen display in a training mode.

The touch button, indicated in the image of FIG. 2 in green with the text "Unlocked" is only displayed if "Training Operation" was selected in FIG. 1. This function simulates to the automatic control that a container is attached or detached, i.e., locked and unlocked. The automatic control then switches the targets between land side and water side. "Unlocked" is typically indicated by a color change to green, whereas the locked state is indicated by a color change to red. Accordingly, the touch button takes on either a green or a red color. By touching the button, the state changes from Locked to Unlocked and vice versa (see FIG. 6).

2.2 Land Side 2.2.1 Travel Direction, Limit Switch, Crab Position

In the image depicted in FIG. 2, the land side of the crane is indicated in the lower right quarter of the image. The crane frame as well as the quay is again schematically indicated in gray. The touch button for switching to the page "Basic Settings" (according to FIG. 1) is located in the area of the quay. Also located in areas of the crane frame are the triangular arrows and the limit switch bars for the crab and lifting motion as well as an indication when the limit switch has been reached, as described above in section 2.1.2 and 2.1.3. On the upper right side, the position of the crab is indicated on the land side crane jib by a red rectangle. The rectangle moves with the movement of the crab over the crane jib and jumps to the crane jib in the upper section of the image, when the triangle reaches the water side of the crane. When returning to the land side, the right rectangle jumps back to the land side jib section.

The load suspended from the crab is intentionally omitted, since the crane operator obtains better information by looking out of the window of the crane cabin.

2.2.2 Park Position

The touch button "Parkp." (Park position) is located in the center between the crane legs. When touching this button, the automatic receives the Park position of the crane crab as the target for the next automatic travel.

2.2.3 Land Side Targets

A container symbol indicated with the label "VC-Pos." (Van Carrier Position) is located on the lower right side of the image. A color change of the grey interior area to light blue indicates that the automatic control has selected the land side target as the next target for the next automatic travel.

If the function "Intermediate Stop" was activated in the image "Basic Settings" (according to FIG. 1), then the automatic control makes an intermediate stop at the so-called lashing position during travel from the ship side towards the land side, before continuing to the intended target "Van Carrier Position."

2.3 Data Display Field

The operating data that have to be constantly available to the crane operator are displayed in the lower left quarter of the image (FIG. 2):

- Load weight in t lifting gear 1 (HW 1), lifting gear 2 (HW 2), and sum of the load weight of lifting gear 1+2
- Lifting height—actual values for lifting gear 1+2
- Wind force
- Position of the spreader (in crab direction, i.e. horizontal component) and of the crab itself
- Automatic operation switched on or switched off; if switched on, corresponding operating step of the automatic control
- Active load of container loading/unloading (vertical or horizontal, with or without intermediate stop, loading or unloading) Note: the automatic control independently determines if loading or unloading takes place. If the first container is grasped on the ship after the start of the operation, then an unloading operation occurs; if the container is grasped on the land side, then a loading operation occurs.
- Coordinates of the next target selected by the automatic 2.4 Message Bar The horizontal message bar in the center of the image informs the crane operator about all states of the crane automatic control:

| State | Display | Color | Blinking |
|---|---|---|---|
| Normal operation | Currently running process | Yellow | No |
| Automatic requires action from the crane operator | Required action | Yellow | Yes |
| Malfunction | Indication, possible cause(s), required remedies | Orange | Yes |
| Warning | Indication, possible cause(s), possibly required remedies | Red | Yes |

Optical signals can be enhanced by announcing text when the computer associated with the touch screen is provided with a sound card.

The currently preferred embodiments shown and described in detail were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method for operating a container quay crane for loading and unloading of containers to and from a vessel, with a computer monitor having a touch screen in a crane operator's cabin, comprising the steps of entering parameters on the touch screen in a training mode, transmitting the parameters to a computer, the computer simulating the loading and unloading of the vessel, betore actually controlling the crane in a fully or partially automatic manner for moving the crane to a container target position.

2. The method according to claim 1, and further comprising the step of setting parameters defining the container target position.

3. The method according to claim 2, wherein the container target position is displayed on the touch screen before being reached by the crane.

4. The method according to claim 1, and further comprising an operating mode selected from the group consisting of Target Position Lead and Loading and Unloading mode.

5. The method according to claim 4, and further comprising the step of switching between the operating modes.

6. The method according to claim 4, wherein the operating modes comprise fully automatic travel or fine-positioning, or both.

7. The method according to claim 1, wherein the touch screen displays actions to be performed by the crane operator.

* * * * *

UNITED STATES PATENT AND TRADEMARK OFFICE

CERTIFICATE OF CORRECTION

PATENT NO. : 6,965,823 B2
APPLICATION NO. : 10/467977
DATED : November 15, 2005
INVENTOR(S) : Wolfgang Wichner It is certified that error appears in the above-identified patent and that said Letters Patent is hereby corrected as shown below:

Title page,
Item [86], should read
-- [86] PCT No.: PCT/DE02/00454

§ 371 (c)(1),
(2), (4) Date: August 18, 2003 --.

Signed and Sealed this

Twentieth Day of June, 2006

JON W. DUDAS
*Director of the United States Patent and Trademark Office*